United States Patent
Harashima et al.

(10) Patent No.: US 6,726,483 B2
(45) Date of Patent: Apr. 27, 2004

(54) ROAD SIMULATION APPARATUS (75) Inventors: Shokichi Harashima, Saitama (JP); Masakazu Kadota, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/429,885

(22) Filed: May 6, 2003

(65) Prior Publication Data
US 2003/0211446 A1 Nov. 13, 2003

Related U.S. Application Data (62) Division of application No. 09/717,339, filed on Nov. 22, 2000, now Pat. No. 6,609,912.

(30) Foreign Application Priority Data

Nov. 24, 1999 (JP) ............................................. 11-332340

(51) Int. Cl.⁷ ................................................. G09B 9/04
(52) U.S. Cl. ................................ 434/61; 434/29; 463/7; 463/46
(58) Field of Search .......................... 434/29, 33, 61, 434/62, 253; 463/1, 67; 273/148 B; 472/89, 130; 482/54, 57, 61; 446/133, 138, 465; 280/293; 180/197; 701/79

(56) References Cited

U.S. PATENT DOCUMENTS

| | | | | |
|---|---|---|---|---|
| 3,686,776 A | * | 8/1972 | Dahl | 434/61 |
| 4,082,265 A | * | 4/1978 | Berkes | 482/61 |
| 4,378,857 A | | 4/1983 | Andersson | |
| 4,580,983 A | * | 4/1986 | Cassini et al. | 482/61 |
| 4,887,967 A | | 12/1989 | Letovsky et al. | |
| 4,925,183 A | * | 5/1990 | Kim | 482/61 |
| 5,006,072 A | * | 4/1991 | Letovsky et al. | 434/61 |
| 5,076,792 A | * | 12/1991 | Niermann | 434/61 |
| 5,209,662 A | | 5/1993 | Fujita et al. | |
| 5,364,271 A | | 11/1994 | Aknin et al. | |
| 5,415,550 A | | 5/1995 | Aoki et al. | |
| 5,547,382 A | | 8/1996 | Yamasaki et al. | |
| 5,782,639 A | | 7/1998 | Beal | |
| 5,951,018 A | * | 9/1999 | Mamitsu | 273/442 |
| 6,030,223 A | | 2/2000 | Sugimori | |
| 6,123,547 A | * | 9/2000 | Teresi | 434/61 |
| 6,126,577 A | * | 10/2000 | Chang | 482/57 |
| 6,142,877 A | * | 11/2000 | Nishimura | 463/46 |
| 6,155,833 A | * | 12/2000 | Lenihan | 434/29 |
| 6,200,138 B1 | * | 3/2001 | Ando et al. | 434/61 |
| 6,234,800 B1 | | 5/2001 | Koyama et al. | |
| 6,283,757 B1 | * | 9/2001 | Meghnot et al. | 434/33 |
| 6,409,596 B1 | | 6/2002 | Hayashida et al. | |

FOREIGN PATENT DOCUMENTS

| | | |
|---|---|---|
| DE | 690 29 172 T2 | 1/1991 |
| DE | 42 07 805 A1 | 9/1993 |
| DE | 692 29 747 T2 | 11/1995 |
| EP | 0 791 907 A1 | 8/1997 |
| JP | 05-087693 A | 4/1993 |
| JP | 05-149833 A | 6/1993 |

* cited by examiner

*Primary Examiner*—Joe H. Cheng
(74) *Attorney, Agent, or Firm*—Birch, Stewart, Kolasch & Birch, LLP

(57) ABSTRACT

A road simulation apparatus wherein front excitation means capable of exciting a front axle of a motorcycle upwardly and downwardly as well as forwardly and rearwardly is connected to the front axle of the motorcycle while rear excitation means capable of exciting a rear axle upwardly and downwardly is connected to the rear axle so that a road load proximate to that experienced by a motorcycle actually running on a road can be reproduces. A bendable link mechanism L comprised of a plurality of links La and Lb are disposed in the forward and rearward directions of the motorcycle for permitting mutual bending motion therebetween is connected for pivotal motion to a stationary support member S. The posture of the test vehicle body is maintained while the regeneration accuracy of road loads is augmented.

6 Claims, 10 Drawing Sheets

ROAD SIMULATION APPARATUS

CROSS-REFERENCE TO RELATED APPLICATIONS

This is a divisional of U.S. application Ser. No. 9/717,339, filed Nov. 22, 2000, now U.S. Pat. No. 6,609,912 B1, the disclosure of which is hereby incorporated by reference and for which priority is claimed under 35 U.S.C. §120, and this application claims priority to Japanese Application No. 11-332340, filed Nov. 24, 1999, the disclosure of which is hereby incorporated by reference and for which priority is claimed under 35 U.S.C. §119.

BACKGROUND OF THE INVENTION

1. Field of the Invention

The present invention relates to a road load simulation apparatus as a test bench for a motorcycle or the like, and particularly to a road simulation apparatus capable of simulating, in test bench conditions, a load proximate to that experienced by a motorcycle actually running on a road.

2. Background Art

For example, a conventional road simulation apparatus includes front excitation means capable of exciting a front axle of a motorcycle upwardly and downwardly as well as forwardly and rearwardly is connected to the front axle. Rear excitation means capable of exciting a rear axle upwardly and downwardly is connected to the rear axle so that a road load proximate to that experienced upon running of a motorcycle on an actual road can be regenerated based on operation of the excitation means (refer to the official gazette of Japanese Patent Laid-open No. Hei 5-149833).

However, in the conventional road simulation apparatus described above, parallel arms are provided which prevent the vehicle from falling down. The parallel arms are supported for upward and downward rocking movement by a stationary support member positioned rearwardly of the vehicle body. Front ends of the parallel arms are connected to a rear axle of the motorcycle to permit pivoting motion of the vehicle body.

In a structure as just described hereinabove, movements of the rear axle in the forward and rearward directions are restricted considerably by the parallel arms whose front ends are effectively limited to simple arcuate movements in the upward and downward directions upon vibrations of the rear axle upwardly and downwardly. Consequently, the stress sensitivity is increased at a portion which is subject to this restriction. This portion is therefore subject to more severe stress conditions than that experienced upon vehicle operation on an actual road. Accordingly, the reproduction performance of the road load may be deteriorated with this type of conventional structure.

SUMMARY OF THE INVENTION

The present invention overcomes the shortcomings associated with the prior art and achieves other advantages not realized by the prior art.

An object of the present invention is to solve the above-described problems of the prior art and to provide a road simulation apparatus with a simplified structure that can solve the problems of conventional road simulation apparatus.

An object of the present invention is to remove artificial restrictions and their associated stress concentrations on a vehicle body subjected to a road simulation apparatus under test conditions.

An object of the present invention is to enhance operational stability of a vehicle body subjected to test conditions according to the road simulation apparatus by preventing the vehicle body from falling over while maintaining accurate road simulation.

A further object of the present invention is to reduce interference between corresponding parts of the road simulation apparatus and vehicle body.

These and other objects are accomplished by a road simulation apparatus for a vehicle having front excitation means capable of exciting a front axle of said vehicle and rear excitation means capable of exciting a rear axle of said vehicle, wherein operation of said front and rear excitation means regenerates a test load representative of a road load experienced by said vehicle when running on an actual road, said road simulation apparatus comprising a bendable link mechanism including a plurality of links which are disposed in forward and rearward directions of said vehicle for permitting mutual bending motion therebetween and a one end portion connected for pivotal motion to a stationary support member, and an other end portion of said bendable link mechanism is connected for pivotal motion to a rear portion of a vehicle body of said vehicle such that movements of said vehicle body in said forward and rearward directions upon excitation of said front and rear excitation means is permitted while said vehicle body is simultaneously prevented from falling down by said bendable link mechanism.

These and other objects are further accomplished by a road simulation apparatus for a vehicle having front excitation means capable of exciting a front axle of said vehicle and rear excitation means capable of exciting a rear axle of said vehicle, wherein operation of said front and rear excitation means regenerates a test load representative of a road load experienced by said vehicle when running on an actual road, said road simulation apparatus comprising a falling down prevention mechanism including a front slide member connected for pivotal motion to a rear portion of a vehicle body at a connection portion and extending rearwardly farther than the connection portion, a rear slide member connected for pivotal motion to a stationary support member located on a rear side from said vehicle and extending forwardly farther than the connection portion, and a slide connection mechanism provided between the two slide members for connecting the two slide members for sliding movement in the forward and rearward directions of said vehicle body while inhibiting relative rotation of the two slide members upon excitation of said front and rear excitation means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Hereinafter, the present invention will be described in detail in connection with embodiments of the present invention shown in the accompanying drawings.

Figure 1:
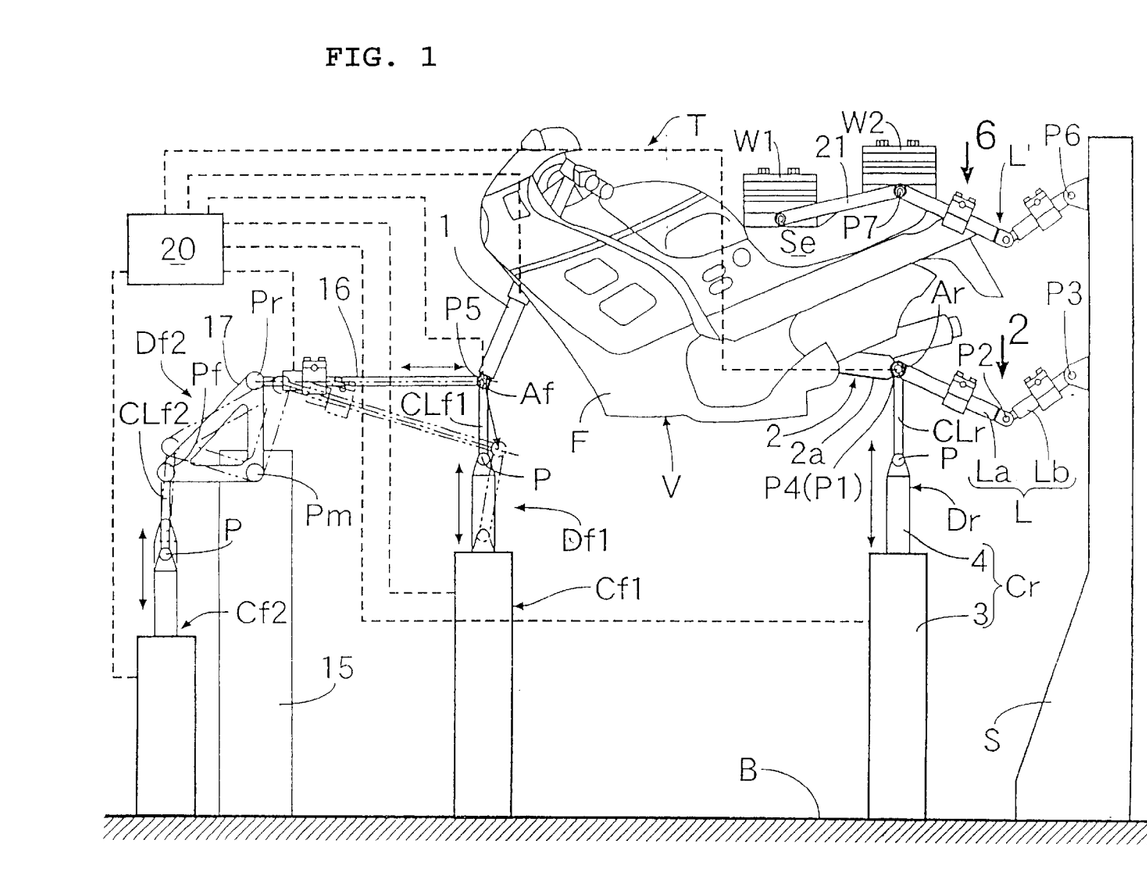
FIG. 1 is a general side elevation view showing a first embodiment of a road simulation apparatus according to an embodiment of the present invention.
Figure 2:
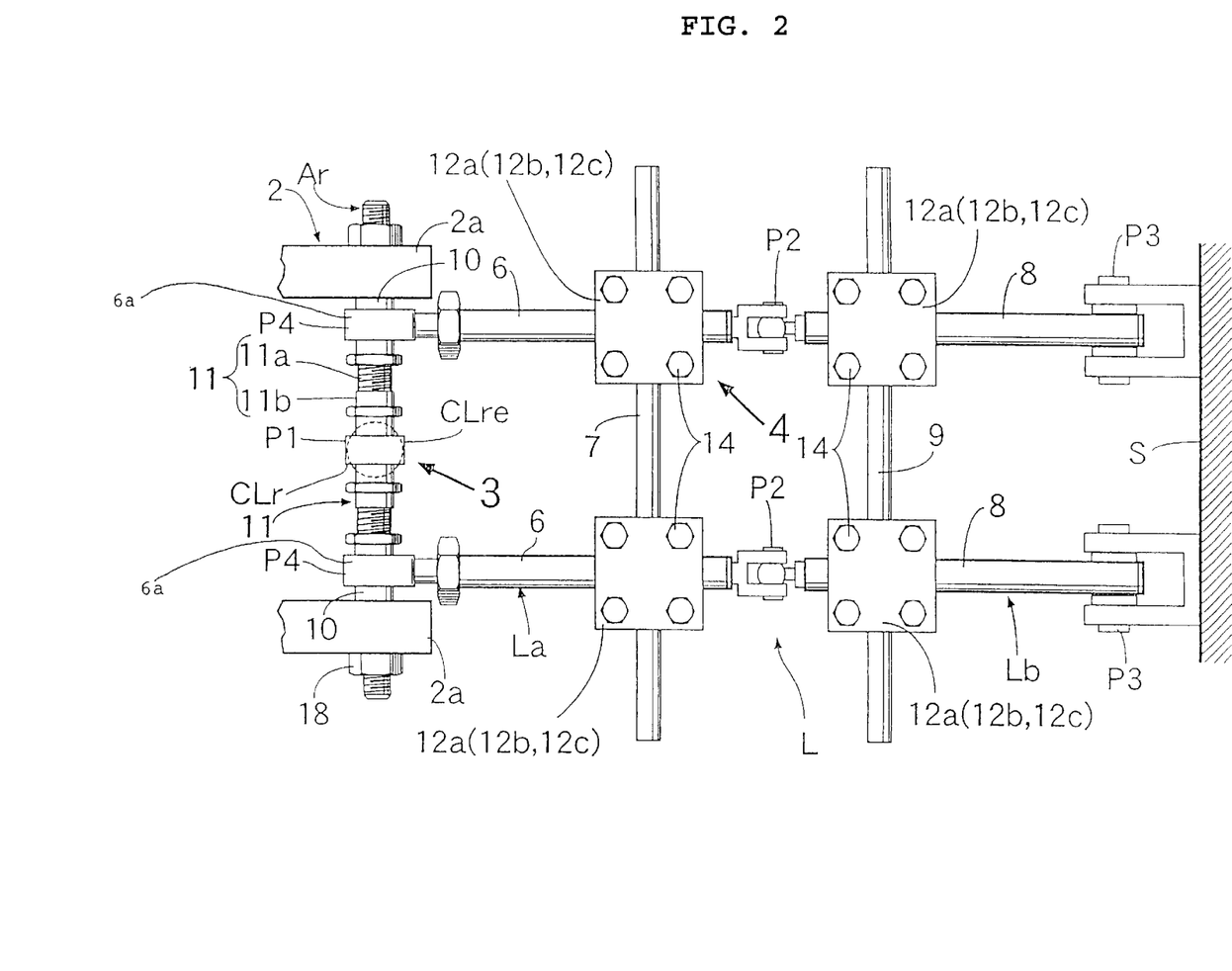
FIG. 2 is an enlarged top plan view as viewed in the direction of an arrow marked 2 in FIG. 1.
Figure 3:
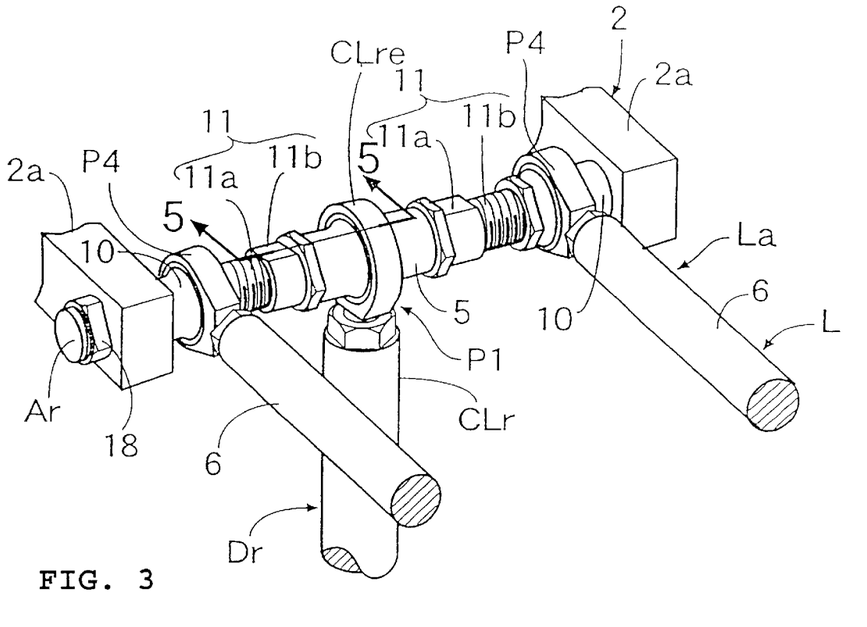
FIG. 3 is an enlarged perspective view as viewed in the direction of an arrow marked 3 in FIG. 2.
Figure 4:
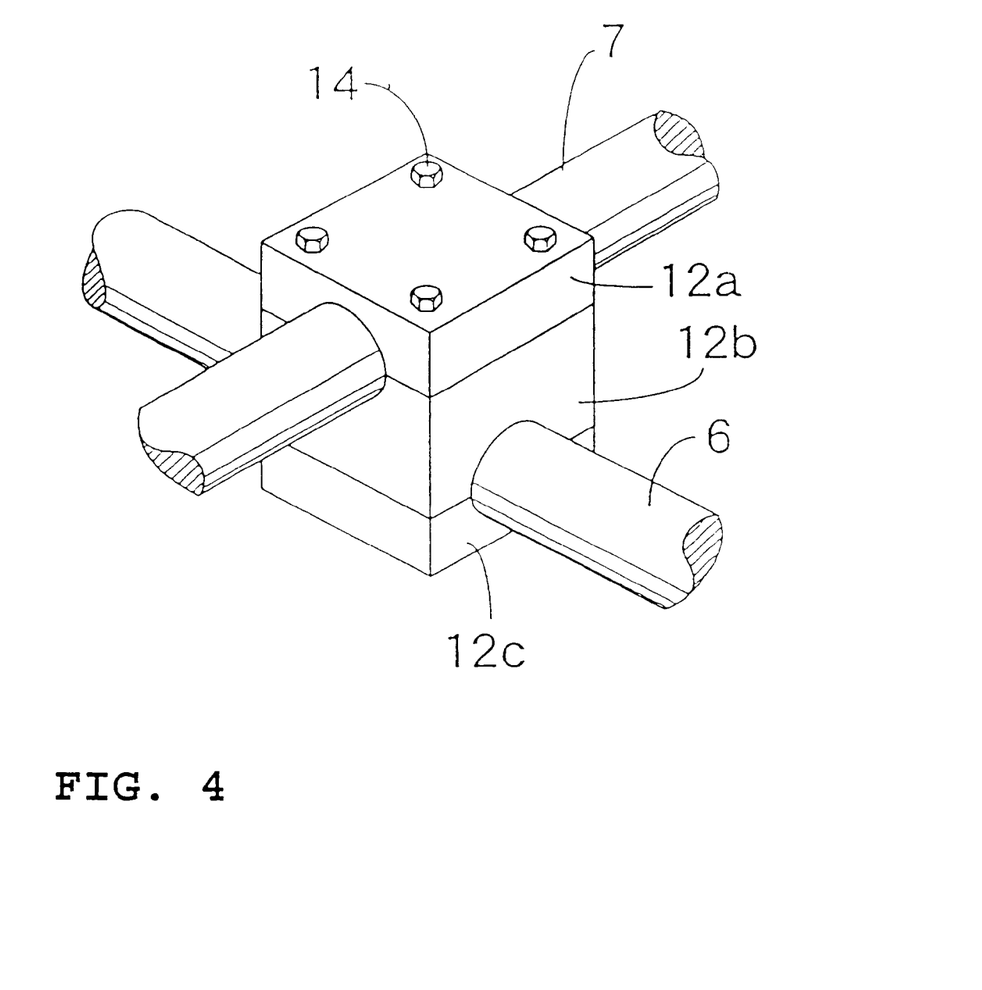
FIG. 4 is an enlarged perspective view as viewed in the direction of an arrow marked 4 in FIG. 2.
Figure 5:
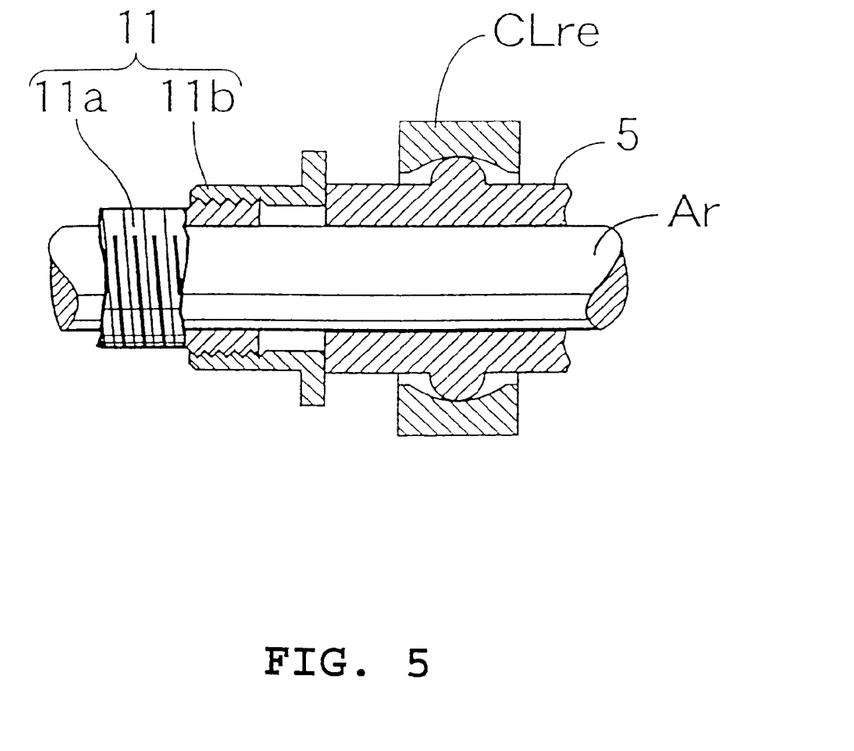
FIG. 5 is an enlarged sectional view taken along line 5—5 of FIG. 3.
Figure 6:
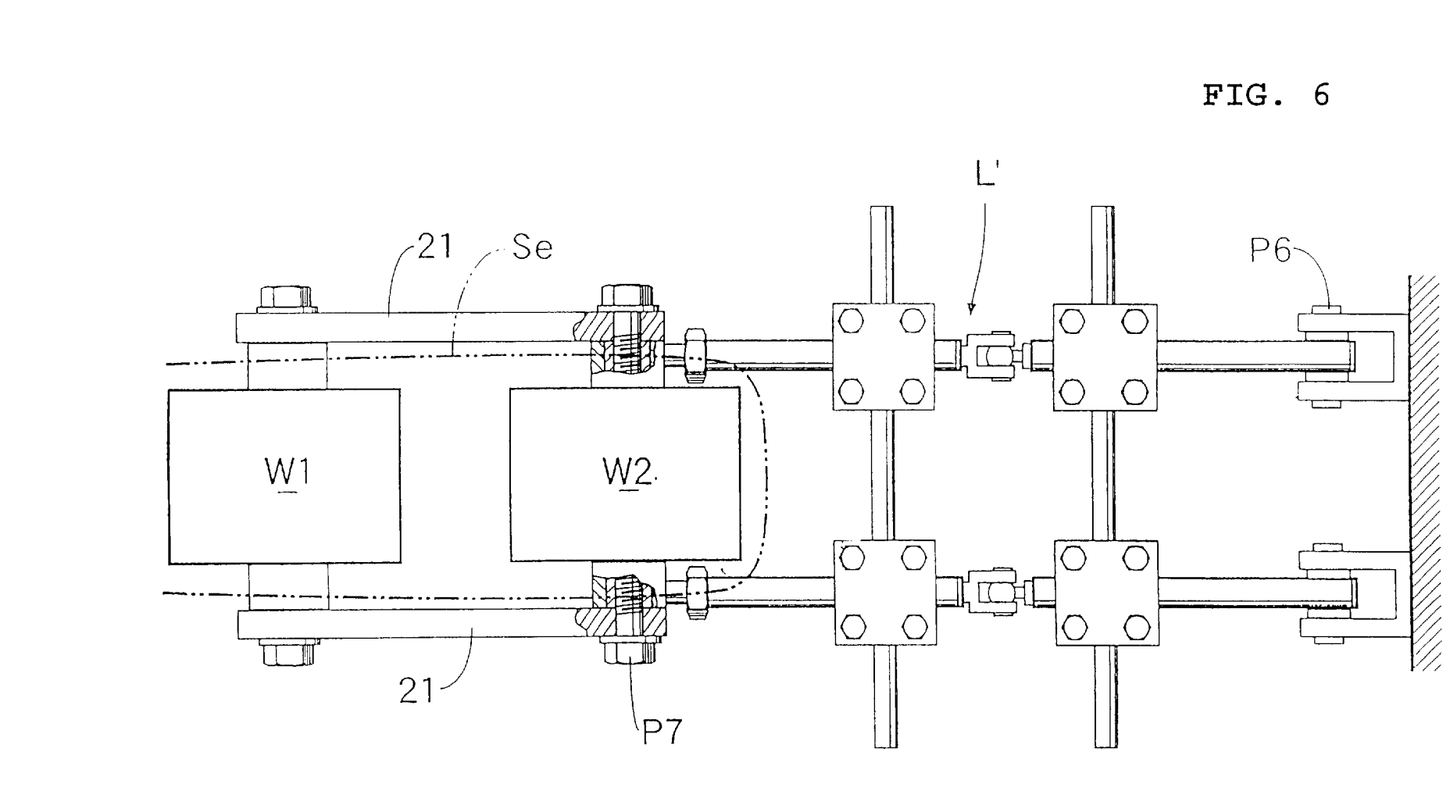
FIG. 6 is an enlarged top plan view as viewed in a direction of an arrow marked 6 in FIG. 1.
Figure 7:
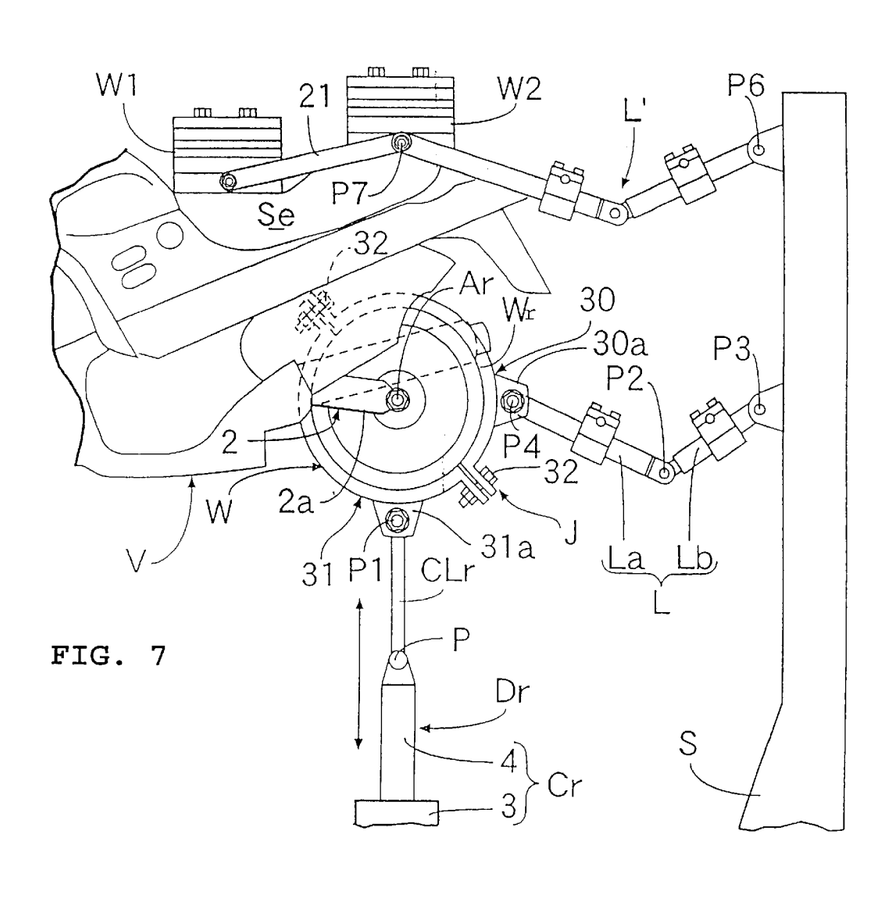
FIG. 7 is a side elevation view showing a road simulation apparatus according to a second embodiment of the present invention.
Figure 8:
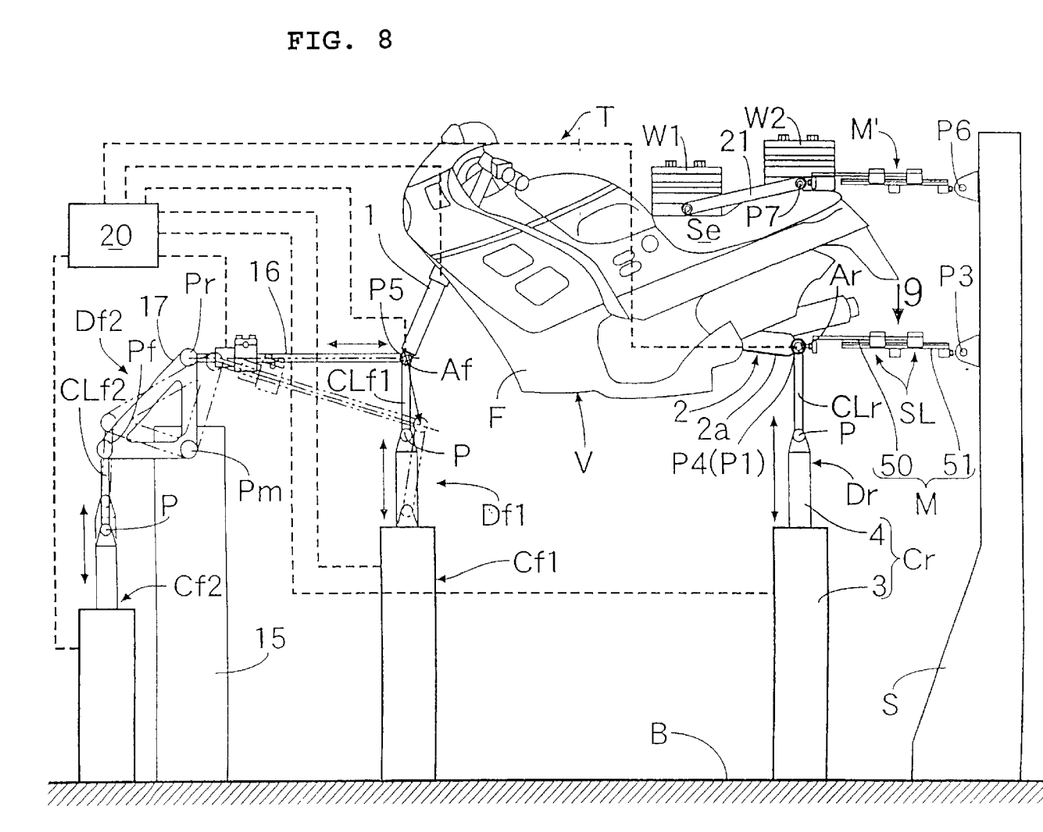
FIG. 8 is a general side elevation view showing a road simulation apparatus according to a third embodiment of the present invention.
Figure 9:
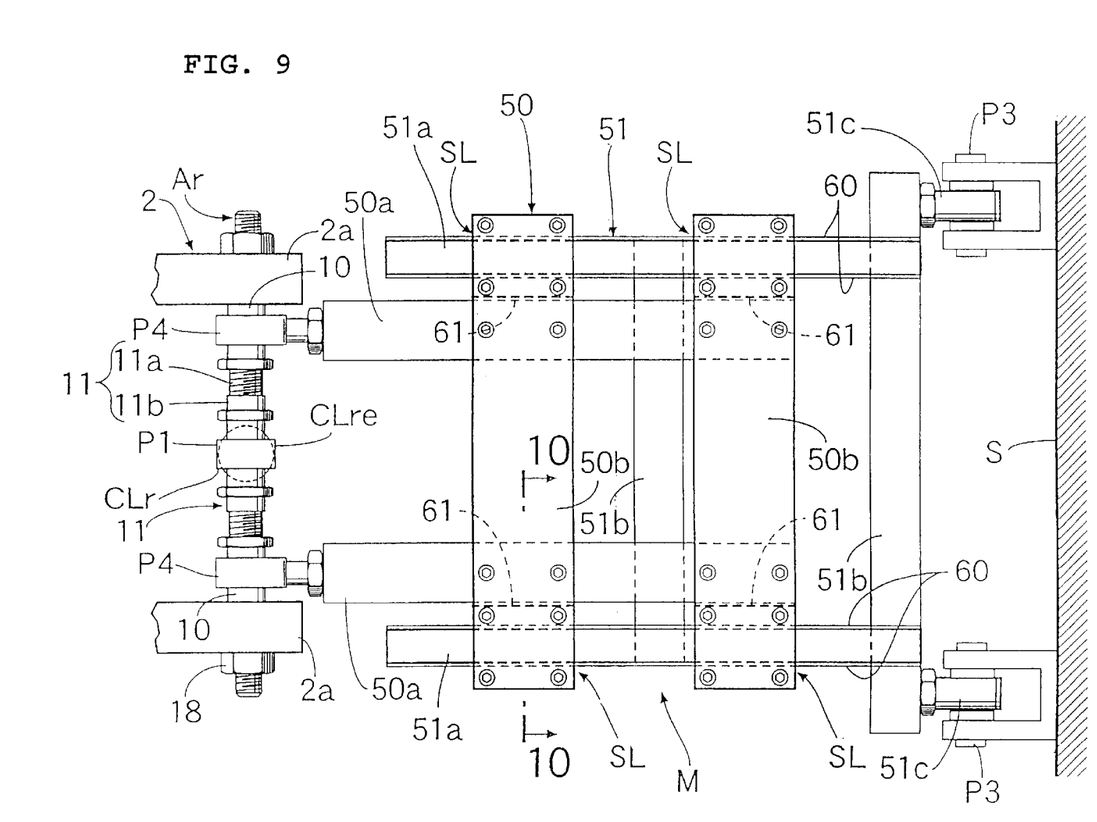
FIG. 9 is an enlarged top plan view (corresponding to FIG. 2) as viewed in a direction of an arrow mark 9 of FIG. 8.
Figure 10:
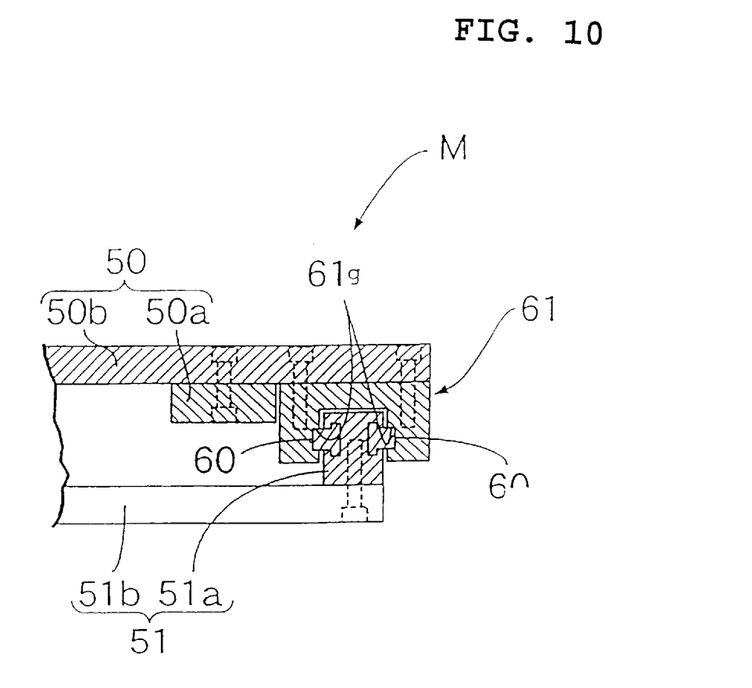
FIG. 10 is an enlarged sectional view taken along line 10—10 of FIG. 9.
Figure 11:
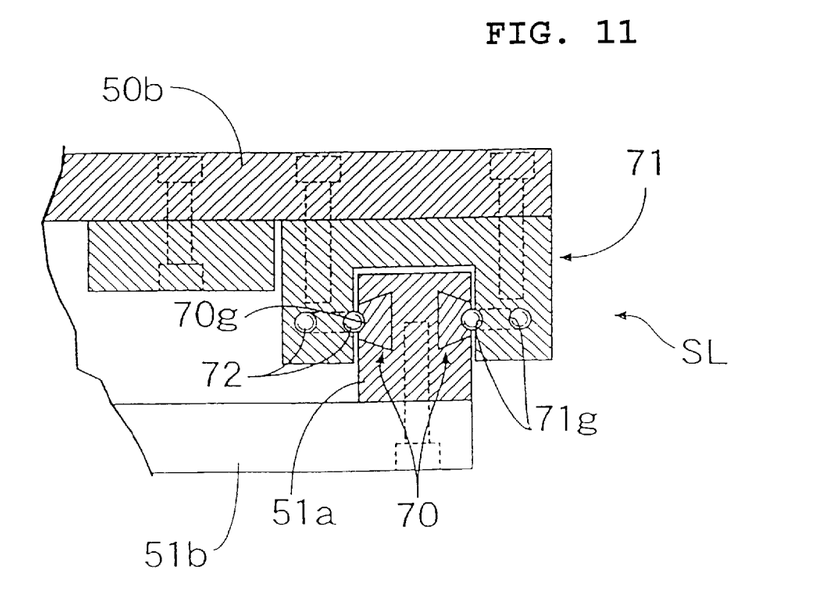
FIG. 11 is an enlarged sectional view, corresponding to FIG. 10, showing a modification to a slide connection mechanism of the present invention.

FIGS. 1 to 6 show a first embodiment of the present invention. FIG. 1 is a general side elevation view showing a first embodiment of a road simulation apparatus according to an embodiment of the present invention. FIG. 2 is an enlarged top plan view as viewed in the direction of an arrow marked 2 in FIG. 1. FIG. 3 is an enlarged perspective view as viewed in the direction of an arrow marked 3 in FIG. 2. FIG. 4 is an enlarged perspective view as viewed in the direction of an arrow marked 4 in FIG. 2. FIG. 5 is an enlarged sectional view taken along line 5—5 of FIG. 3. FIG. 6 is an enlarged top plan view as viewed in a direction of an arrow marked 6 in FIG. 1. FIG. 7 is a side elevation view showing a road simulation apparatus according to a second embodiment of the present invention. FIG. 8 is a general side elevation view showing a road simulation apparatus according to a third embodiment of the present invention. FIG. 9 is an enlarged top plan view (corresponding to FIG. 2) as viewed in a direction of an arrow mark 9 of FIG. 8. FIG. 10 is an enlarged sectional view taken along line 10—10 of FIG. 9. FIG. 11 is an enlarged sectional view, corresponding to FIG. 10, showing a modification to a slide connection mechanism of the present invention.

First, referring to FIGS. 1 to 6 which show a first embodiment, a road simulation apparatus T is installed on a base surface B, and a motorcycle V excited by this apparatus T is placed in a state wherein front and rear wheels thereof are removed in advance. With respect to the road simulation apparatus of the present invention, any of the actual conditions and loading likely to be experienced by a vehicle, such as a motorcycle, running on an actual road are anticipated as being within the spirit and scope of the present invention. A front axle Af is secured to a rear end portion of a front fork 1 (that is, a front suspension of the telescopic type) supported for steering rotation at a front portion of a vehicle body F of the motorcycle V.

A rear fork 2 is supported for upward and downward rocking motion at a rear portion of the vehicle body F and a rear cushion (not shown) is interposed between the rear fork 2 and the vehicle body F. The rear fork 2 is formed in a bifurcated configuration, and a rear axle Ar is secured to rear ends of left and right end portions 2a of the rear fork 2 by means of a nut 18.

The road simulation apparatus T includes front excitation means Df1 and Df2 connected to the front axle Af of the motorcycle V. Front excitation means Df1,Df2 are capable of exciting the front axle Af upwardly and downwardly as well as forwardly and rearwardly. Rear excitation means Dr connected to the rear axle Ar and capable of exciting the rear axle Ar upwardly and downwardly can reproduce a road load proximate to that experienced upon actual running of the motorcycle V based on the collective operation of the excitation means Df1, Df2 and Dr.

The rear excitation means Dr is comprised of a hydraulic cylinder Cr of the double acting type capable of exerting bidirectional forces of tension and compression, and a connection bar CLr connected to the hydraulic cylinder Cr. A cylinder body 3 of the hydraulic cylinder Cr is installed and secured vertically on the base surface B.

A lower end of the connection bar CLr is pivot connected P for pivotal motion to an upper end of a piston rod 4 which extends from an upper end of the cylinder body 3 of the hydraulic cylinder Cr. An upper end of the connection bar CLr and a central portion of the rear axle Ar are pivot connected P1 for pivotal motion relative to each other around a horizontal axis of the axle. The latter pivot connection portion P1 is composed of an eyeball-like connection portion CLre provided integrally at an upper end of the connection bar CLr (see FIG. 3), and a connection tube 5 held in spherical contact for vibration with an inner circumferential face of the eyeball-like connection portion CLre. The connection tube 5 is loosely fitted at a central portion of the rear axle Ar.

The rear axle Ar is supported by a bendable link mechanism L on a stationary support member S installed uprightly on and secured to the base surface B rearwardly of the rear excitation means Dr. Movements of the vehicle body F in the forward and backward directions, as well as in the upward and downward directions, upon excitation are permitted. The vehicle body F is prevented from falling down by the bendable link mechanism L.

The bendable link mechanism L is comprised of a plurality of (in the example shown, a front and rear pair of) links La and Lb disposed in the forward and backward directions of the motorcycle V and pivot connected P2 to each other for permitting bending pivotal motion around a first horizontal axis parallel to the rear axle Ar. Rear end portions of the bendable link mechanism L (that is, rear end portions of the rear link Lb) are pivot connected P3 to the support member S for pivotal motion around a second horizontal axis parallel to the rear axle Ar. Front end portions of the bendable link mechanism L (that is, front end portions of the front link La) are pivot connected P4 to a central portion of the rear axle Ar for pivotal motion around an axis of the same (see FIG. 2 and FIG. 3).

As clearly shown in FIG. 2, the front link La is composed of a pair of left and right linear link arms 6 extending in parallel in a spaced relationship from each other, and a cross member 7 for connecting intermediate portions of the link arms 6 to each other. The rear link Lb is comprised of a pair of left and right linear link arms 8 extending in parallel in a spaced relationship from each other and individually pivot connected P2 to the left and right link arms 6, and a cross member 9 for integrally connecting intermediate portions of the link arms 8 to each other.

The left and right link arms 6 (8) and the cross member 7 (9) are connected to each other by holding the link arms 6 (8) and the cross member 7 (9) between three layered connection members 12a, 12b and 12c stacked in this order and tightening them by means of bolts 14. Arcuate grooves for engaging with the link arms 6 (8) or the cross member 7 (9) are formed on relatively opposing faces of the 12a, 12b, 12c. It is to be noted that employment of such a connection structure as just described allows arbitrary adjustment of the mutual distance between the left and right link arms 6 (8).

As shown in FIG. 2, the rear ends of the left and right link arms 8 of the rear link Lb are individually pivot connected P3 to the support member S described above. As shown in FIG. 2 and FIG. 3, eyeball-like connection portions 6a at the front ends of the left and right link arms 6 of the front link La are individually pivot connected P4 to the rear axle Ar between the bifurcated left and right end portions 2a of the rear fork 2 and the pivot connection portion P1 of the connection bar CLr described hereinabove.

The left and right pivot connection portions P4 at the front ends of the link arms 6 of the front link La have a structure for allowing vibrations similar to that of the pivot connection portion P1 of the connection bar CLr described hereinabove. Spacers 11 are interposed between the connection tubes 5 and 10 of the pivot connection portions P1 and P4. Each of the spacers 11 is comprised of a bolt member 11a for fitting with the rear axle Ar, and a nut member 11b screwed on the bolt member 11a. The spacers 11 have effective lengths that can be variably adjusted in an axial direction of the spacers 11 by rotating the bolt member 11a and the nut member 11b relative to each other.

The front excitation means is comprised of first front excitation means Df1 for exciting the front axle Af upwardly and downwardly, and second front excitation means Df2 for exciting the front axle Af forwardly and rearwardly. The first front excitation means Df1 is comprised of a hydraulic cylinder Cf1 of the double acting type having a structure similar to that of the rear excitation means Dr described hereinabove and a connection bar CLf1 pivot connected P to the hydraulic cylinder Cf1. Since they have structures similar to those of the rear excitation means Dr, description of them is omitted.

The second front excitation means Df2 is comprised of a hydraulic cylinder Cf2 of the double acting type having a structure similar to that of the hydraulic cylinder Cf1 of the first front excitation means Df1, a connection bar CLf2 pivot connected P at a lower end thereof to the hydraulic cylinder Cf2, a triangular rockable arm 17 pivot connected Pf at a front end portion thereof for pivotal motion to the bar CLf2 and pivot connected Pm at an intermediate base portion thereof for pivotal motion to a support member 15 fixed on the base surface B, and a connection link 16 pivot connected Pr at a front end thereof for pivotal motion to a rear end portion of the arm 17 and pivot connected P5 at a rear end thereof for pivotal motion to the front axle Af. Accordingly, excitation force in the forward and rearward directions is applied to the front axle Af through the connection bar CLf2, rockable arm 17 and connection link 16 in response to upward and downward expansion and contraction movements of the hydraulic cylinder Cf2.

It is to be noted that the connection link 16 described above has a construction similar to that of the front link La of the bendable link mechanism L described hereinabove. The pivot connection structures of the rear end of the connection link 16 and the upper end of the connection bar Cf1 of the first front excitation means Df1 to the front axle Af are similar to the pivot connection structures of the front end of the front link La and the upper end of the connection bar Cr of the rear excitation means Dr described above to the rear axle Ar, respectively.

The cylinders Cr, Cf1 and Cf2 of the excitation means Dr, Df1 and Df2 are connected to a control apparatus 20 for controlling displacements of the cylinders Cr, Cf1 and Cf2. By controlling the displacements of the cylinders Cr, Cf1 and Cf2, exciting forces in the upward and downward directions can be applied to the rear axle Ar and exciting forces in the upward and downward directions and the forward and rearward directions can be applied to the front axle Af thereby to reproduce a road load proximate to that experienced upon vehicle operation on an actual road. A description of a concrete technique for the excitation control is omitted in the present specification because it is conventionally known and an example of the technique is disclosed in the official gazette of Japanese Patent Laid-open No. Hei 5-149833 referred to in the description of the conventional art herein.

In the present embodiment, a pair of front and rear weights W1 and W2 for applying a load representative of a passenger on the motorcycle V are placed on a tandem seat Se of the motorcycle V as shown in FIGS. 1 and 6. In order to prevent lateral displacement of the weights W1 and W2 upon excitation of the vehicle body, the weights W1 and W2 are connected to each other by a pair of left and right connection rods 21 and front end portions of a second bendable link mechanism L'. The second bendable link mechanism L' is pivot connected P6 at rear end portions to the support member S above the bendable link mechanism L described hereinabove. Front end portions of the link mechanism L' are pivot connected P7 for pivotal motion around a horizontal axis parallel to the rear axle Ar to rear end portions of the connection rods 21.

Since the second bendable link mechanism L' has a structure similar to that of the bendable link mechanism L described hereinabove, description of the second bendable link mechanism L' is omitted. It is to be noted that such weights W1 and W2 and the second bendable link mechanism L' as described above are provided as required in the road simulation process and they may be omitted if they are not necessary during operation.

Subsequently, operation of the first embodiment is described. In the test bench of the motorcycle V, a rear portion of the road simulation apparatus T and the cylinders Cr, Cf1 and Cf2 of the excitation means Dr, Df1 and Df2 are suitably controlled for displacement by the control apparatus 20. Exciting forces in the upward and downward directions can be applied to the rear axle Ar and in the upward and downward directions and the forward and rearward directions can be applied to the front axle Af, to reproduce a road load proximate to that experienced by a vehicle operating upon an actual road.

A measuring instrument such as a strain gauge is attached to a suitable location of the vehicle body F. A determination of the associated strain, deformation, etc. of the vehicle body when in a strained or deformed state can be measured in a state wherein the vehicle body is subjected to a road load, representative of that experienced by the vehicle body when running on an actual road. Analyzed data from the vehicle body can be utilized for designing, improvements, etc . . .

In the road simulation apparatus T of the present invention, the rear axle Ar and the stationary support member S are connected to each other by the bendable link mechanism L of the structure described above, and movements of the vehicle body F in the forward and rearward directions and the upward and downward directions upon excitation are permitted while the vehicle body is prevented from falling down by the bendable link mechanism L. Consequently, even during excitation of the vehicle body F, the bendable link mechanism L can prevent falling down of the vehicle body F with certainty and without restricting the movements of the vehicle body in the forward and rearward directions. Accordingly, stabilization of the posture of the vehicle body upon excitation is achieved.

Since the restriction of the vehicle body F in the forward and rearward directions upon excitation is eliminated in this manner, even a portion of the vehicle body F whose stress sensitivity is normally enhanced by such restrictions in the conventional art, can now be excited in a condition proximate to that actually experienced by a vehicle body running on an actual road. Consequently, augmentation of the reproduction performance of a road load is achieved by the present invention.

Further, in the present embodiment, since the second bendable link mechanism L' disposed above the bendable link mechanism L is provided, the movements of the vehicle body F in the forward and rearward directions upon excitation are permitted while lateral displacement or falling down of the weights W1 and W2 placed on the seat Se can be prevented by the second bendable link mechanism L'.

A second embodiment of the present invention is shown in FIG. 7. In the present embodiment, a mounting jig J is removably mounted on an outer periphery of a rim portion Wr of a rear wheel W supported for rotation on the rear axle Ar by a bearing. A front end portion of the bendable link mechanism L described hereinabove and the rear excitation means Dr are individually connected for relative pivotal motion to the mounting jig J.

The mounting jig J is comprised of a pair of semicircular bands 30 and 31 made of metal and formed with a curvature substantially equal to that of the outer peripheral face of the rim portion Wr of the rear wheel W on which a rubber tire is would normally be mounted. A screw member 32 for removably fastening opposing end portions of the bands 30 and 31 to each other is also provided. The rim portion Wr of the rear wheel W can be held between and secured by the bands 30 and 31 by tightening the screw member 32 in a state wherein the outer periphery of the rim portion Wr of the rear wheel W is held between the bands 30 and 31. A mounting bracket 30a provided in a projecting manner on the outer face of the band 30 is positioned at a rear end portion of the mounting jig J, and a mounting bracket 31a provided in a projecting manner on the outer face of the other band 31 is positioned at a lower end portion of the mounting jig J. Then, a front end portion of the bendable link mechanism L is pivot connected P4 for pivotal motion around an axis parallel to the rear axle Ar to the mounting bracket 30a of the band 30 while an upper end portion of the connection bar CLr of the rear excitation means Dr is pivot connected P1 for pivotal motion around the axis parallel to the rear axle Ar to the mounting bracket 31a of the band 31.

The second embodiment can exhibit operation similar to that of the first embodiment. Since the mounting jig J of the structure described above is used, the bendable link mechanism L and the rear excitation means Dr can be spaced farther from a location around the rear axle Ar where vehicle parts such as the rear fork 2 are provided in a concentrated manner, and consequently, mutual interference of the vehicle parts can be readily prevented.

A third embodiment of the present invention is shown in FIGS. 8 to 10. The present embodiment includes, in place of the bendable link mechanism L of the first embodiment, a falling down prevention mechanism M of the slide type provided between the rear axle Ar and the stationary support member S such that movements of the vehicle body F in the forward and rearward directions and the upward and downward directions upon excitation are permitted and falling down of the vehicle body F is prevented by the falling down prevention mechanism M.

The falling down prevention mechanism M is comprised of a front slide member 50 connected for pivotal motion to a rear portion of the vehicle body F (in the example shown, the rear axle Ar) of the motorcycle V and extending rearwardly farther than the connection portion, a rear slide member 51 connected for pivotal motion to the support member S and extending forwardly farther than the connection portion, and a slide connection mechanism SL provided between the two slide members 50 and 51 for connecting the slide members 50 and 51 to each other for sliding movement only in the forward and rearward directions of the vehicle body, but preventing relative rotation between the slide members 50 and 51.

The front slide member 50 is formed from a grid-like framework composed of a plurality of (in the example shown, a pair of) front longitudinal rods 50a extending in parallel in a spaced relationship from each other in the leftward and rightward directions and a plurality of (in the example shown, a pair of) front lateral rods 50b for integrally coupling the front longitudinal rods 50a. The rear slide member 51 is formed from a grid-like frame composed of a plurality of (in the example shown, a pair of) rear longitudinal rods 51a extending in parallel in a spaced relationship from each other in the leftward and rightward directions and a plurality of (in the example shown, a pair of) rear lateral rods 51b for integrally coupling the rear longitudinal rods 51a.

Front end portions of the front slide member 50, that is, front end portions of the front longitudinal rods 50a, are individually pivot connected P4 for pivotal motion to the rear axle Ar by connection structures similar to those of the front end portions of the front link La (link arms 6) of the first embodiment. Rear end portions of the rear slide member 51 (that is, a pair of left and right connection rods 51c securely mounted on rear faces of the opposite left and right end portions of the rear lateral rods 51b) are individually pivot connected P3 for pivotal motion to the support member S by connection structures similar to those of the rear ends of the rear link Lb (link arms 8) of the first embodiment.

The slide connection mechanism SL described above includes a pair of left and right rails 60 provided integrally at the opposite left and right side portions of the longitudinal rods 51a of the rear slide member 51 and extending in the longitudinal direction of the rear slide member 51, and movable members 61 each having a channel-shaped transverse section and provided integrally on the front slide member 50 (in the example shown, the front lateral rods 50b) such that it extends across the rear longitudinal rods 51a. The movable members 61 have guide grooves 61g formed on inner faces of the opposite left and right side portions for engaging for relative sliding movement with the rails 60 in the forward and rearward directions of the vehicle body.

Further, a pair of front and rear weights W1 and W2 for applying a load similar to that when a passenger is onboard are placed on the tandem seat Se of the motorcycle V in a similar manner as in the first embodiment. In order to prevent lateral displacement of the weights W1 and W2, a falling down prevention mechanism M' having a structure similar to that of the falling down prevention mechanism M described hereinabove is interposed between the weights W1 and W2 and the support member S. The falling down prevention mechanism M' operates similarly to the second bendable link mechanism L' of the first embodiment.

The other construction is basically similar to that of the first embodiment, and therefore, components corresponding to those of the first embodiment are denoted by like reference characters and description of the structure is omitted.

In the road simulation apparatus T of the third embodiment, the rear axle Ar and the stationary support member S are connected to each other by the falling down prevention mechanism M of the slide type having the structure described above, and movements of the vehicle body F in the forward and rearward directions and the upward and downward directions upon excitation are permitted while falling down of the vehicle body is prevented by the falling down prevention mechanism M. Consequently, even during excitation of the vehicle body F, the falling down prevention mechanism M can prevent falling down of the vehicle body F with certainty without restricting the movements of the vehicle body in the forward and rearward directions. Stabilization of the posture of the vehicle body upon excitation and so forth is thereby achieved.

The elimination of the restriction of the vehicle body F in the forward and rearward directions upon excitation in this manner allows excitation even of the portion at which the stress sensitivity is normally raised by restrictions present in the conventional art. Accordingly, excitation is achieved in a condition proximate to that experienced while a vehicle is running on an actual road, and augmentation of the reproduction performance of road loads is achieved.

It is to be noted that the slide connection mechanism SL of the present invention is not limited to the structure described above, but may use such a conventionally known linear sliding guide mechanism (refer to, for example, the official gazette of Japanese Patent Laid-open No. Sho 61-180018) as shown in FIG. 11 which is composed of track rails 70 with a linear groove 70g, a movable member 71 having an endless circulating grooves 71g corresponding to the linear grooves 70g, and a large number of rollers 72 arranged for rolling movement in the endless circulating grooves 71g and also in the linear grooves 70g as the slide connection mechanism SL in order to achieve reduction of the resistance against the sliding movement.

For example, the pair of left and right track rails 70 are secured to the opposite left and right end portions of a rear longitudinal rod 51a of the rear slide member 51, and the movable member 71 which is formed in a channel shape such that it extends across the rear longitudinal rod 51a is secured to the front slide member 50 (in the example shown, a front lateral rod 50b).

Though not shown, the bendable link mechanism L in the second embodiment may be replaced by the falling down prevention mechanism M of the slide type described in the third embodiment. In this instance, a front end portion of the front slide member 50 (that is, a front end portion of each of the front longitudinal rods 50a) is pivot connected P4 for pivotal motion to the mounting bracket 30a of the mounting jig J similarly to the front end portion of the bendable link mechanism L of the second embodiment.

While the embodiments of the present invention have been described above, the present invention can be carried out in various forms within the scope of the invention and is not limited to the embodiments described above.

For example, while the first and second embodiments use the bendable link mechanism L composed of two links La and Lb, the bendable link mechanism of the present invention is only required to have a structure which permits movements of the vehicle body in the forward and rearward directions and the upward and downward directions upon excitation and simultaneously prevents falling down of the vehicle body. Thus, the bendable link mechanism of the present invention may be formed from three or more links arranged in the forward and rearward directions, or may be formed as a pantograph from two upper and lower sets of two, three or more links arranged in the forward and rearward directions.

Further, the links La and Lb which form the bendable link mechanism L in the first and second embodiments are formed as a coupled member of two link arms extending in parallel in a spaced relationship from each other in the leftward and rightward directions. However, each of the links in the present invention may be formed from a single link arm if torsional rigidity sufficient to prevent falling down of the vehicle body is mechanically/structurally achieved.

Further, while each of the front and rear slide members 50 and 51 in the third embodiment is formed from a grid-like framework comprised of a plurality of longitudinal rods and a plurality of lateral rods, at least one of the slide members 50 and 51 in the present embodiment may be formed in the form of a single plate or block if torsional rigidity sufficient to prevent falling down of the vehicle body is structurally achieved.

Further, while the embodiments described above are described wherein the other end portion (front end portion) of the bendable link mechanism L and the front end portion of the front slide member 50 are pivot connected directly to the rear axle Ar or pivot connected to the rim portion Wa on the axle Ar, in the present invention, the other end portion (front end portion) of the bendable link mechanism L and the front end portion of the front slide member 50 may be connected for relative movement at suitable locations of a rear portion of the vehicle body other than the locations specified as above.

It is to be noted that it is within the spirit and scope of the present invention that the motorcycle of the present invention may includes a bicycle with a prime mover and a motor scooter.

As described above, with the invention according to any one of the claims, a road simulation apparatus of a motorcycle is constructed such that movements of a vehicle body in forward and rearward directions upon excitation are permitted and falling down of the vehicle body is prevented by a bendable link or slide type mechanism interposed between a stationary support member and a rear portion of the vehicle body of the motorcycle. Consequently, even during excitation of the vehicle body, the bendable link mechanism or the falling down prevention mechanism of the slide type can prevent falling down of the vehicle body with certainty without restricting movements of the vehicle body in the forward and backward directions. Accordingly, stabilization of the posture of the vehicle body upon excitation can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A road simulation apparatus for a vehicle having front excitation means capable of exciting a front axle of said vehicle and rear excitation means capable of exciting a rear axle of said vehicle, wherein operation of said front and rear excitation means reproduces a test load representative of a road load experienced by said vehicle when running on an actual road, said road simulation apparatus comprising:

a falling down prevention mechanism including a front slide member connected for pivotal motion to a rear portion of a vehicle body at a connection portion and extending rearwardly farther than the connection portion, a rear slide member connected for pivotal motion to a stationary support member located on a rear side from said vehicle and extending forwardly farther than the connection portion, and a slide connection mechanism provided between the two slide members for connecting the two slide members for sliding movement in the forward and rearward directions of said vehicle body while inhibiting relative rotation of the two slide members upon excitation of said front and rear excitation means.

2. The road simulation apparatus according to claim 1, further comprising:

a front end portion of said front slide member and said rear excitation means are individually connected for pivotal motion to a mounting jig removably mounted on an outer periphery of a rim portion of a rear wheel supported on said rear axle of the vehicle body.

3. The road simulation apparatus according to claim 2, said mounting jig further comprising:

a pair of semicircular bands formed with a curvature substantially equal to that of an outer peripheral face of the rim portion of the rear wheel of said vehicle body;

a mounting bracket provided in a projecting manner on an outer face of one of the bands is positioned at a rear end portion of the mounting jig; and a second mounting bracket provided in a projecting manner on the outer face of the other band is positioned at a lower end portion of the mounting jig.

4. The road simulation apparatus according to claim 3, wherein a front end portion of said front slide member is pivot connected for pivotal motion around an axis parallel to the rear axle to one of the mounting brackets of the bands.

5. The road simulation apparatus according to claim 2, the slide connection mechanism further including:

a pair of left and right rails provided integrally at opposite left and right side portions of longitudinal rods of the rear slide member and extending in the forward and rearward direction of the vehicle body; and movable members each having a channel-shaped transverse section and provided integrally on the front slide member such that it extends across the rear longitudinal rods of said front slide member.

6. The road simulation apparatus according to claim 5, wherein the movable members have guide grooves formed on inner faces of the opposite left and right side portions for engaging and providing relative sliding movement with the rails arranged in the forward and rearward directions of the vehicle body.

* * * * *